US009325175B2

(12) United States Patent
Tumilty et al.

(10) Patent No.: US 9,325,175 B2
(45) Date of Patent: Apr. 26, 2016

(54) PHASE ANGLE DRIFT METHOD FOR LOSS OF MAINS/GRID PROTECTION

(75) Inventors: Ryan M. Tumilty, Glasgow (GB); Adam Dysko, Motherwell (GB); Graeme Burt, Johnstone (GB)

(73) Assignees: Alstom Technology Ltd., Baden (CH); Schneider Electric Energy UK Ltd., Leeds (GB)

( * ) Notice: Subject to any disclaimer, the term of this patent is extended or adjusted under 35 U.S.C. 154(b) by 1063 days.

(21) Appl. No.: 13/499,669

(22) PCT Filed: Sep. 30, 2009

(86) PCT No.: PCT/EP2009/062666
§ 371 (c)(1),
(2), (4) Date: Jul. 13, 2012

(87) PCT Pub. No.: WO2011/038756
PCT Pub. Date: Apr. 7, 2011

(65) Prior Publication Data
US 2012/0271575 A1    Oct. 25, 2012

(51) Int. Cl.
*F03D 11/00*    (2006.01)
*H02J 3/38*    (2006.01)

(52) U.S. Cl.
CPC .............. *H02J 3/38* (2013.01); *H02J 2003/388* (2013.01)

(58) Field of Classification Search
CPC .................................................... F03D 11/0091
USPC .................................... 702/60; 375/316, 279
See application file for complete search history.

(56) References Cited

U.S. PATENT DOCUMENTS 7,809,083 B1 * 10/2010 Wu ..................... H04L 27/2332
375/279

FOREIGN PATENT DOCUMENTS

WO    WO 2006/068634 A2    6/2006

OTHER PUBLICATIONS

Dysko, Adam et al., "Novel Protection Methods for Active Distribution Networks with High Penetrations of Distributed Generation—Year II Report," DTI Centre for Distributed Generation and Sustainable Electrical Energy, Jun. 2006.
Dysko, Adam et al., "Satellite Communication Based Loss-of-Mains Protection," 9th International Conference on Developments in Power System Protection, Glasgow, UK, vol. 1, p. 687-692, Mar. 2008.

(Continued)

*Primary Examiner* — Lam Nguyen
(74) *Attorney, Agent, or Firm* — Knobbe, Martens, Olson & Bear, LLP

(57) ABSTRACT

A phase angle drift method for loss of mains/grid protection is disclosed. According to one aspect, an accumulated electrical phase angle drift derived from the difference between the current measured local frequency and the estimated frequency using historical data is compared to an angle threshold. An estimated grid frequency may be calculated based on the historical delay, and the window, over which the estimated frequency is calculated. An addition/subtraction of a phase angle offset value is calculated for a half cycle is performed when the frequency difference between the estimated frequency $f_n^{est}$ and the measured frequency $f_n$ is greater or equal to a first determined value.

15 Claims, 8 Drawing Sheets

(56) References Cited

OTHER PUBLICATIONS

Fehr, R.E. III, "A Novel Approach for Understanding Symmetrical Components and Sequence Networks of Three-Phase Power Systems," 2006.

International Preliminary Report on Patentability for International application No. PCT/EP2009/062666, dated Oct. 5, 2011, in 13 pages.

International Search Report and Written Opinion for International application No. PCT/EP2009/062666, dated Sep. 14, 2010, in 16 pages.

PCT Chapter II Demand for International application No. PCT/EP2009/062666, dated Nov. 24, 2010, in 14 pages.

Varjasi, Istvan et al., "Sensorless Control of a Grid-Connected PV Converter," Power Electronics and Motion Control Conference, 2006.

\* cited by examiner

PHASE ANGLE DRIFT METHOD FOR LOSS OF MAINS/GRID PROTECTION

RELATED APPLICATIONS

This application is a U.S. National Phase of International Application No. PCT/EP2009/062666, filed Sep. 30, 2009, which is incorporated by reference in its entirety.

BACKGROUND OF THE INVENTION

1. Field of the Invention

This invention relates to a phase angle drift/PAD/method for loss of mains/grid protection.

2. Background

The term LOM ("Loss of Mains") is used to describe the condition where a generator is inadvertently isolated from the grid and continues to supply local demand. This condition is unacceptable for a number of reasons, including: the risk to DNO ("Distribution Network Operator") operatives whilst reconfiguring the network, out of phase re-closure, the potential for a live unearthed network and the provision of a poor quality supply to local demand.

Existing passive methods of LOM detection that find common application include ROCOF ("Rate of Change of Frequency") and VS ("Vector Shift"). However, concern has been raised regarding their stability in response to network faults and, to a lesser extent, the degree of sensitivity offered. These two performance criteria are intimately related, with sensitivity often being sacrificed to obtain a higher level of stability by increasing the threshold settings of the element.

The PAD ("Phase Angle Shift") method is an alternative that provides inherently enhanced stability without sacrificing sensitivity. It continues with the prevailing practice of using only passive techniques and thus requires no additional invasive hardware.

The PAD concept is based on the detection of the electrical phase angle drift of a system after islanding. This change arises from the frequency excursion due to the mismatch between local demand and generator output.

The phase angle change can be calculated in a number of different ways using either only a local measurement or by making additional use of a communicated remote frequency measurement from the utility. In either case, it is a derivation of the frequency change with respect to the grid that is used to calculate the accumulated phase angle drift. Assuming that only a local measurement is to be used, three alternatives are considered for the implementation of the PAD concept:

1. Method 1—Based on the Locally Delayed Voltage Angle Signal

This method uses a one cycle Fast Fourier Transform (FFT) transformation to evaluate the angle change over a moving window by comparing the current angle of the fundamental frequency component with a value calculated previously (assumed to be still reflective of the grid). The principle is defined mathematically in equation (1) below.

$$\alpha_n = \text{angle}[FFT(V_n \ldots V_{n-24})_{50\,Hz}] - \text{angle}[FFT(V_{n-T} \ldots V_{n-24-T})_{50\,Hz}] \quad (1)$$

Where:
$V_n$: Measured voltage samples
$\alpha_n$: Phase angle difference between most recent and delayed signal
T: Historical delay The angle $\alpha_n$ is continually compared with the threshold value and a trip signal is produced if the value exceeds the setting. However, a number of issues arise with this method:

The algorithm requires a constant sampling rate.
The algorithm requires direct access to the sampled input values.
Channel switching logic is required to counter loss of phase voltages and is essentially replicating functionality in the frequency tracking algorithm.

2. Method 2—Voltage Phase Angle Calculated from the Local Value of df/dt

This method is an extension of the conventional ROCOF algorithm. It evaluates the angle from the value of df/dt using equation (2). In order to prevent slow 'creeping' of the integrator it is necessary to apply an additional high-pass filter or a triggering and reset algorithm which rejects very slow variations of the angle.

$$\omega_n = \omega_{n-12} + 2\pi \frac{\left(\frac{df}{dt}\right)_n + \left(\frac{df}{dt}\right)_{n-12}}{2} T_{12sample} \quad (2)$$

$$\Delta\alpha_n = \frac{\omega_n + \omega_{n-12}}{2} T_{12samples}$$

$$\alpha_n = \alpha_{n-1} + \Delta\alpha_n - \Delta\alpha_{n-T}$$

Where:
$\omega_n$: Current rotational frequency
$\omega_{n-12}$: Previous rotational frequency
$\Delta\alpha_n$: Change in phase angle
$T_{12samples}$: Time interval between algorithm executions (0.5/$f_{n-12}$)

The angle $\alpha_n$ is again continually compared with the threshold value and a trip signal is produced if the value exceeds the setting. From equation (2) above, it can be observed that a double integration is required in addition to performing the conventional ROCOF calculation and thus the method is reasonably computationally intensive. However, it is noted that the averaging effect would be advantageous with regard to noise cancellation.

3. Method 3—Based on Frequency Extrapolation

As disclosed in document referenced [1] at the end of the specification, this method is based on the threshold comparison of an accumulated electrical phase angle drift derived from the difference between the current measured local frequency and that estimated using historical data (this being reflective of the current grid frequency). Equation (3) below forms the basis of the method for deriving the phase angle using both the current measured value from the tracking algorithm and an estimated frequency calculated using linear extrapolation from stored historical frequency values. It is evaluated every half cycle (12 samples) of the fundamental waveform and a transformation is applied to provide the angle in degrees.

$$\alpha_n = \alpha_{n-12} + 2\pi(f_n^{est} - f_n)T_{12samples} \quad (3)$$

Where:
n: Sample index
$\alpha_n$: Updated phase angle
$f_n^{est}$: Estimated frequency
$\alpha_{n-12}$: Previous phase angle
$f_n$: Measured frequency
$T_{12samples}$: Time interval between algorithm executions The linear extrapolation to provide an estimate of grid frequency is given by equation (4) in which the key parameters are the historical delay (D cycles) and the window (W cycles) over which the estimate is calculated. The corresponding time delays naturally undergo changes as the sampling rate is modified by the frequency tracking algorithm in response to fundamental frequency variations. FIG. 1 illustrates the principles of this estimation graphically.

$$f_n^{est} = f_{n-D-W} + \frac{(T_W + T_D)}{T_W}(f_{n-D} - f_{n-D-W}) \quad (4)$$

Where:
$f_{n-D-W}$: Oldest frequency value
$f_{n-D}$: Newest frequency value
$T_D$: Historical time delay
$T_W$: Estimation window When a true LOM event occurs, the measured frequency deviates from its nominal rated value (in practice, frequency is maintained by the system operator within a statutory band (±1%) around the nominal rated value of 50 or 60 Hz) and thus a difference exists with respect to the estimated grid value. This difference in frequency leads to changes in the phase angle that increases (drifts) with time. The nature of this increase is complex and is dependent upon a range of factors, including: generator inertia, initial power imbalance and the parameters of the method used for frequency estimation.

Values of 10 and 40 cycles may be selected for W and D respectively. The reasoning for the selection of these values is based on the following interrelated factors:
  Firstly, the sum of these values should be kept to a reasonable size so as to avoid unnecessarily large amounts of historical data being stored in memory.
  Secondly, the main impact of D is in the magnitude of the angle drift that can be accumulated. If a small value is used then the estimated frequency will quickly catch up with the tracked value and thus the phase angle as calculated according to equation (3) no longer increases. As a consequence, lower angle thresholds have to be applied which will then in turn reduce the improved stability characteristics of the algorithm.
  Thirdly, the selection of W must be made with the knowledge that a small value will expose the estimation to overshoots due to short duration disturbances in the frequency tracker output due to transients such as phase changes.

As an example, FIG. 2 shows the accumulated phase angle response for an ideal input of a 200 mHz/s ramp occurring at 1.5 s with a range of D values (W is kept at a constant value of 10 cycles).

A purpose of the invention is to provide a method that offers enhanced stability during grid disturbances (e.g. faults) that will reduce the number of unnecessary generator trips.

SUMMARY

The invention concerns a phase angle drift method for loss of mains/grid protection, wherein the accumulated electrical phase angle drift derived from the difference between the current measured local frequency and the estimated frequency using historical data is compared to a angle threshold with the phase angle draft $\alpha_n$ being such that:

$$\alpha_n = \alpha_{n-12} + 2\pi(f_n^{est} - f_n)T_{12samples} \quad (3)$$

Where:
n: Sample index
$\alpha_n$: Updated phase angle
$\alpha_{n-12}$: Previous phase angle
$f_n^{est}$: Estimated frequency
$f_n$: Measured frequency
$T_{12samples}$: Time interval between algorithm executions the estimated grid frequency being calculated using the following equation (4) in which the key parameters are the historical delay, D cycles, and the window, W cycles, over which the estimated frequency is calculated:

$$f_n^{est} = f_{n-D-W} + \frac{(T_W + T_D)}{T_W}(f_{n-D} - f_{n-D-W}) \quad (4)$$

where:
$f_{n-D-W}$: Oldest frequency value
$f_{n-D}$: Newest frequency value
$T_D$: Historical time delay
$T_W$: Estimation window characterized in that the addition/subtraction of the phase angle increase/decrease calculated for the last half cycle in equation (3) is not carried out unless the frequency difference between the estimated frequency $f_n^{est}$ and the measured frequency $f_n$ is greater or equal to a first determined value, for example 0.05 Hz.

Advantageously the phase angle is reset to zero once changes in the phase angle have fallen below a second determined value, for example 0.8°, over a moving window equal to the size of the estimation window $T_W$.

Advantageously if the difference between the new estimated frequency and the previous estimated frequency is greater or equal to than a third determined value, for example 0.002 Hz, then the new estimated frequency is discarded and replaced with the previous estimated frequency plus 0.002.

Advantageously if a three phase fault is detected with a retained positive sequence voltage magnitude of less than a fourth determined value, for example 60%, and negative sequence voltage magnitude greater than a fifth determined value, for example 40%, then the angle threshold is increased to twice its set value for the duration of the fault.

Advantageously once the fault has been cleared, the angle threshold is linearly reduced to its set value over a period of a sixth determined value, for example 0.25 second.

While the present invention is described herein in connection with certain embodiments, it is to be understood that the invention is not limited to the disclosed embodiments, but, on the contrary, is intended to cover various modifications and equivalent arrangements included within the spirit and scope of the appended claims, and equivalents thereof.

DETAILED DESCRIPTION OF CERTAIN EMBODIMENTS

Figure 1:
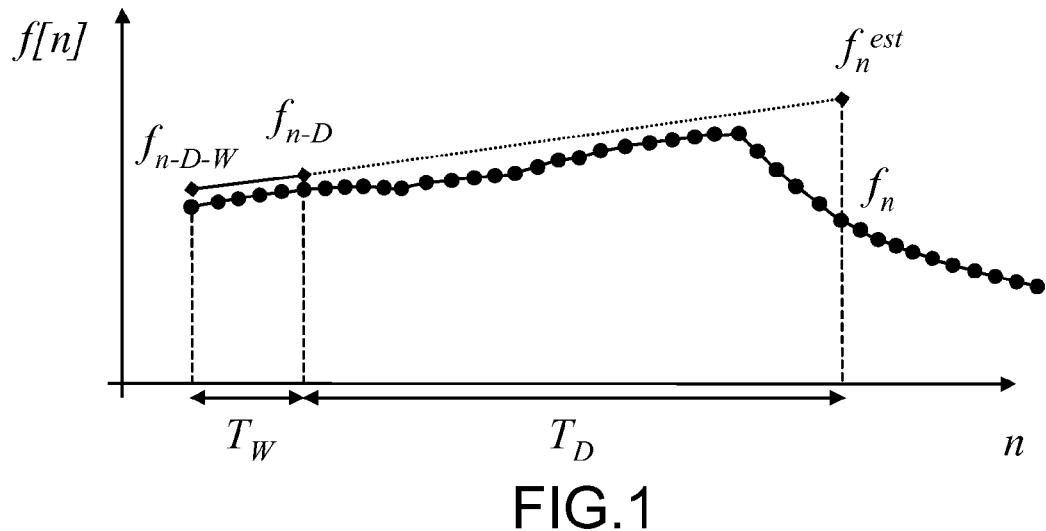
FIG. 1 shows frequency estimation parameters definition in prior art method.
Figure 2:
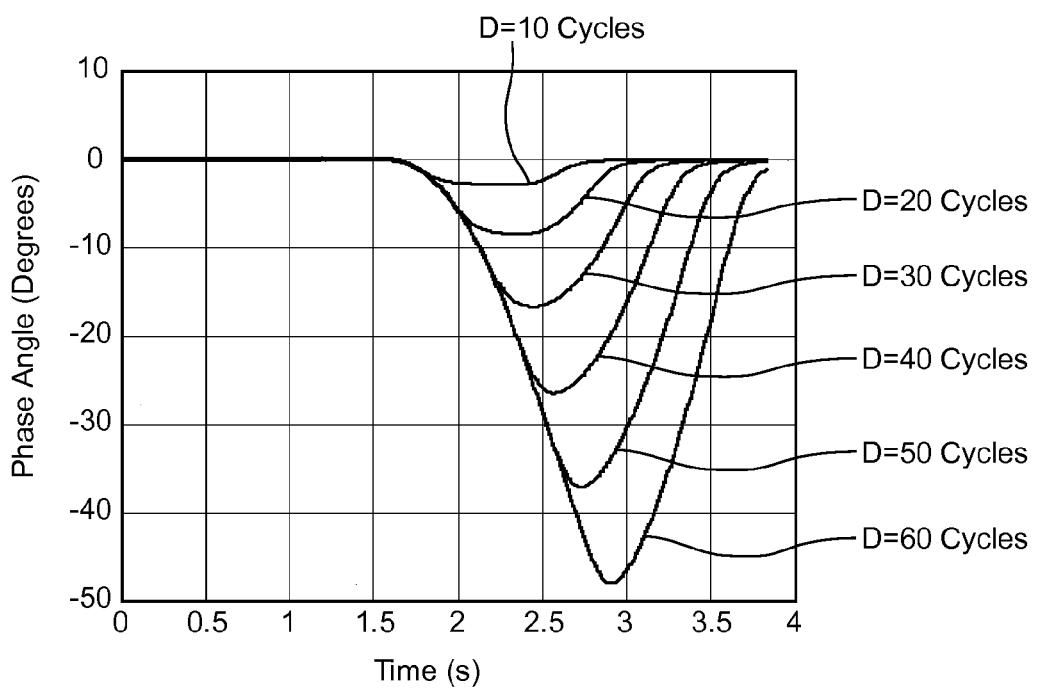
FIG. 2 shows phase angle responses for varying extrapolation delays in the prior art method considered in FIG. 1.
Figure 3:
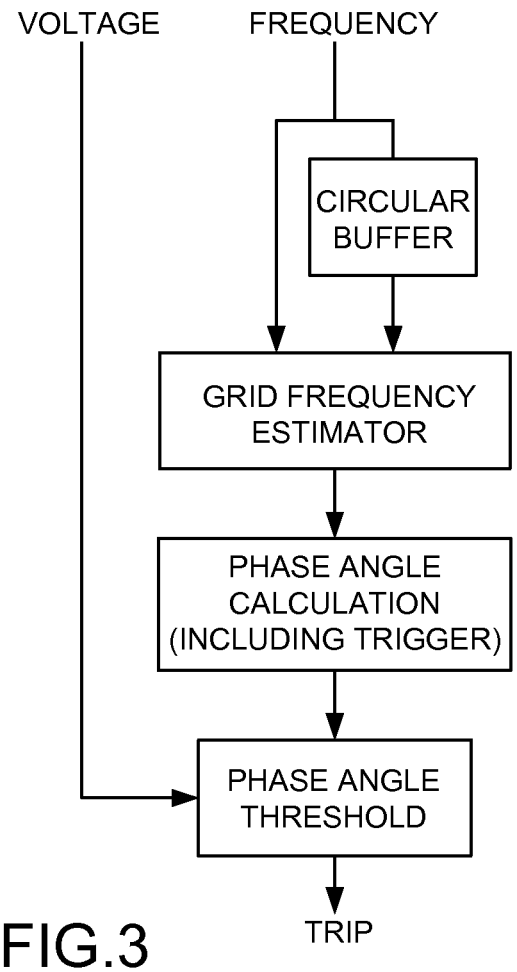
FIG. 3 shows a block diagram for the invention method.

The invention method is dependent on only passive principles with a tripping threshold being applied to an accumulated phase angle drift calculated from measured frequency values (this is obtained from the existing functionality of the relay). A block diagram for the method is given in FIG. 3. The method is based on the threshold comparison of an accumulated phase angle drift derived from the difference between the current measured local frequency and that estimated using historical data (this being reflective of the current grid frequency). Above equation (3) above forms the basis of the method for deriving the phase angle using both the current measured frequency value and an estimated grid frequency calculated using linear extrapolation from stored historical frequency values. The estimated grid frequency is calculated using the above equation (4) in which the key parameters are the historical delay, D cycles, and the window, W cycles.

Figure 4:
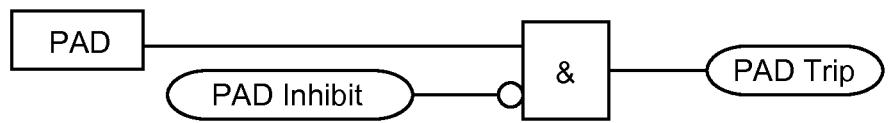
FIG. 4 shows a Phase Angle Drift protection block diagram corresponding to the invention.

The PAD element is a passive LOM method that is executed every half cycle of the fundamental waveform and is implemented as a single stage protection, as shown in FIG. 4.

The phase angle drift is calculated using equation (3) using the estimated grid frequency calculated using equation (4) with the terms W and D set to 10 and 40 cycles respectively.

Since the invention is based on an accumulated phase angle calculation, small fluctuations in grid frequency during normal operation and calculation errors have the potential to cause a long term drift which could lead to spurious tripping. This issue is addressed in the following two ways:

1. To avoid drift due to small computation errors in the calculation of the frequency estimate, the addition/subtraction of the angle increase/decrease calculated for the last half cycle (equation (3) is not carried out unless the frequency difference between $f_n^{est}$ and $f_n$ is greater or equal to a determined value, for example 0.05 Hz.

2. Finally, long term drift is removed by resetting the angle once changes in the angle have fallen below a value of a determined value, for example 0.8° over a moving window equal to the size of the extrapolation window. This is also used as a trigger value to start the evaluation of the voltage phase angle.

The stability of the invention method in the presence of faults has been improved through the use of two methods as described below:

1. If the difference between the new estimated frequency and the previous estimate is greater or equal to than a determined value, for example 0.002 Hz, then the new value is discarded and replaced with the previous value plus 0.002 Hz. The basis for selecting this value is that it corresponds to the frequency change observed over half a nominal cycle during a ramp change of 200 mHz/s.

2. A further stabilisation method is used to detect the presence of a three-phase fault by using thresholds applied to positive (V1) and negative (V2) sequence voltage magnitudes. If a three phase fault is detected with a retained V1 magnitude of less than 60% for example and V2 less then 40% for example then the angle threshold is increased to twice its set value for the duration of the fault. Once the fault has been cleared (again detected with thresholds applied to V1 and V2), the angle threshold is linearly reduced to its set value over a period of a determined value, for example 0.25 s.

Invention Method Performance Analysis

The following sections firstly concern some general issues about the design and some example Matlab model responses to a range of test inputs, and finally, some comments made on the minimum theoretical sensitivity of the method. In all the results presented below, W and D have been set to values of 10 and 40 cycles respectively.

These results have been produced using a Matlab model (coded m-file) built to refine the design. In all cases a trip setting of 20° has been used with no time delay (no time delay is recommended for PAD due to the transitory nature of the trip (Trp) signal resulting from the reset mechanism).

1. Ideal Ramp Frequency and Phase Shift Changes

Figure 5A:
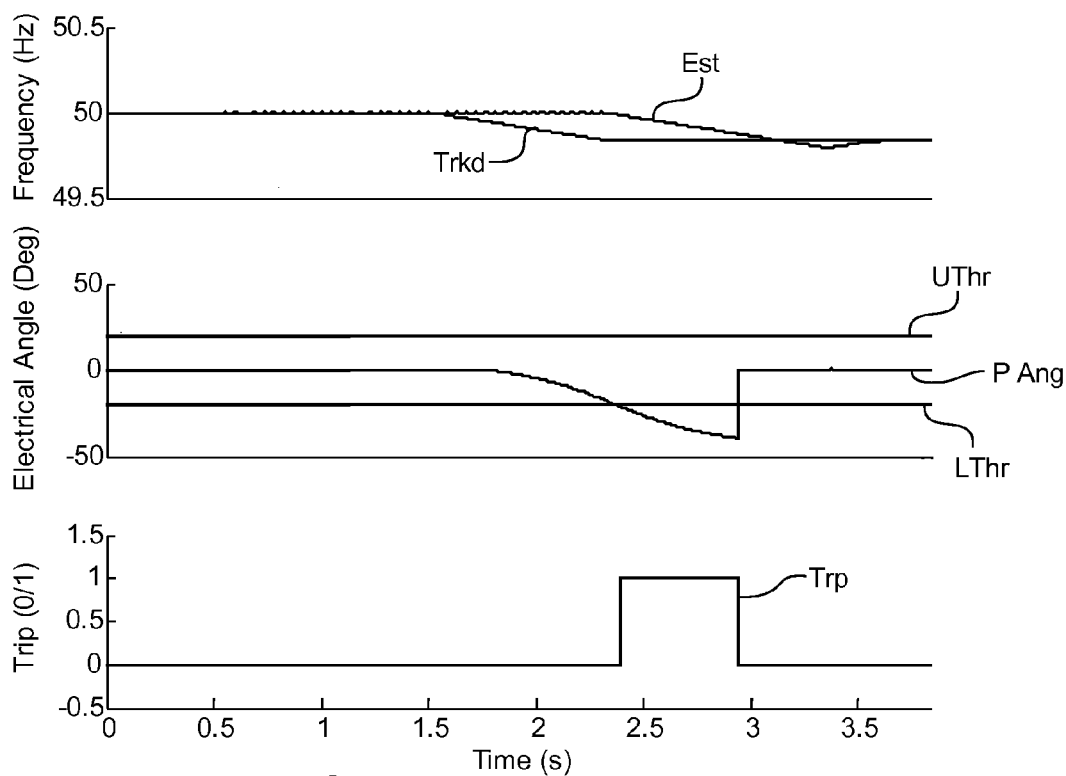
FIGS. 5A and 5B show responses to ideal ramp inputs.
Figure 5B:
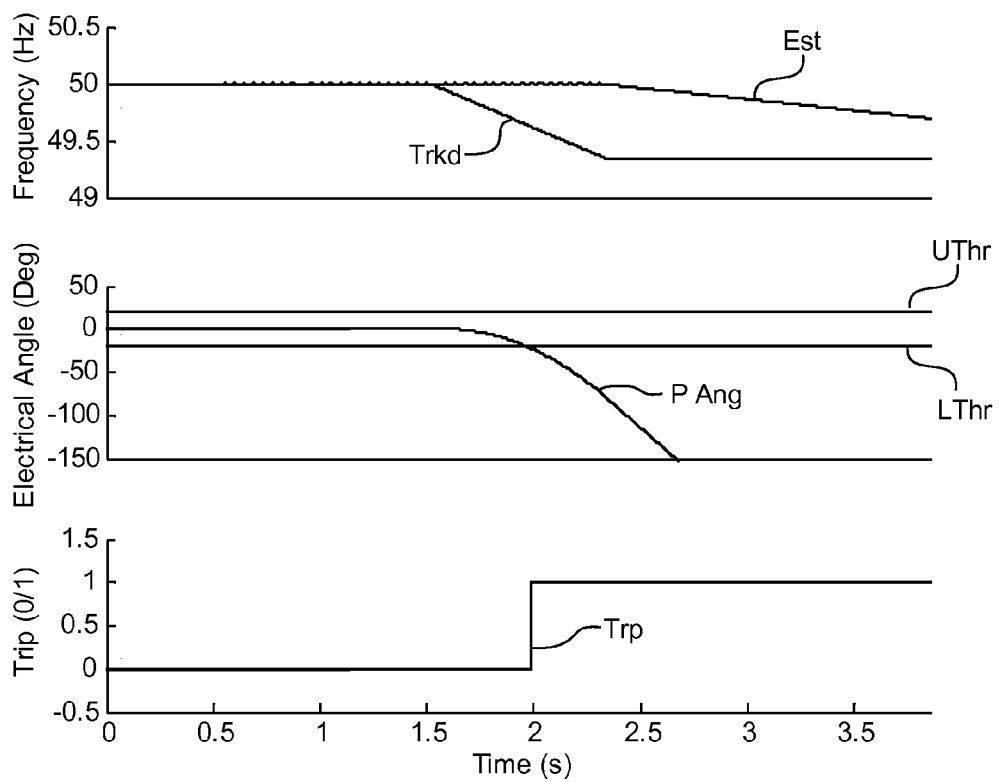

The response of the method to ideal frequency ramps of −200 Hz/s and −800 Hz/s beginning at 1.5 s are given in FIGS. 5A and 5B respectively. In both examples, the estimated frequency (Est) can be seen to remain at nominal until the extrapolation method has reached the stored data corresponding to the ramp. Detection of the ramp change can be seen in both examples. Although for 200 mHz/s case the reset action (Trp) in the algorithm occurs after tripping as the rate of increase in angle falls (Pang) below the trigger setting (L Thr).

Figure 6A:
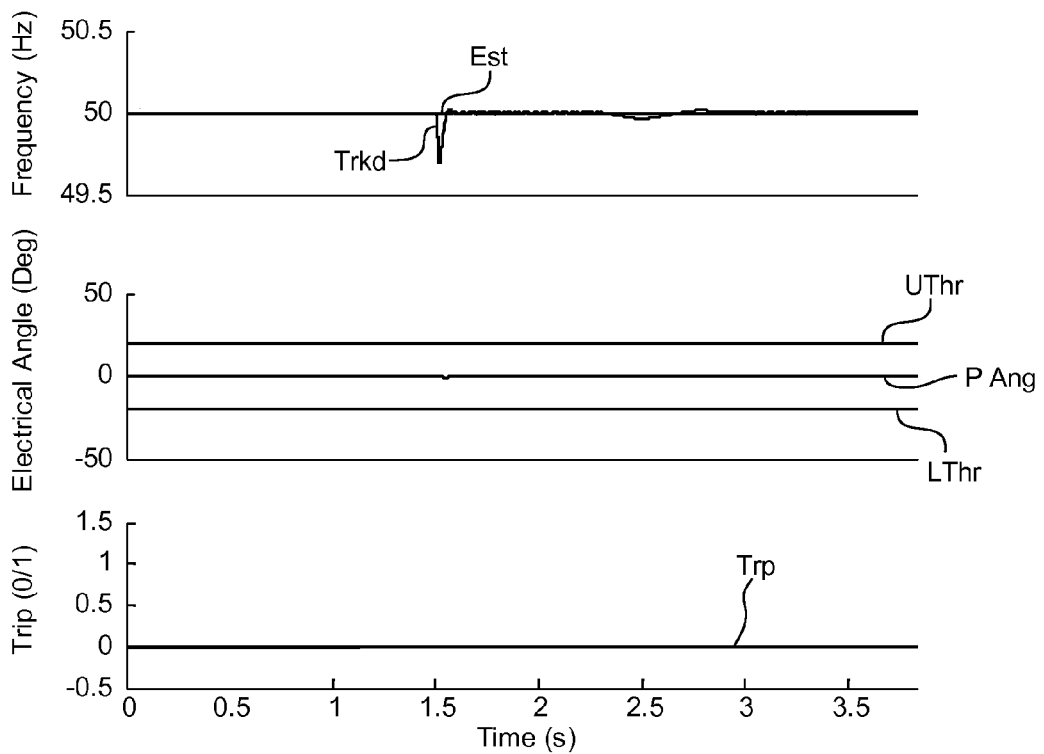
FIGS. 6A and 6B show responses to phase stop changes.
Figure 6B:
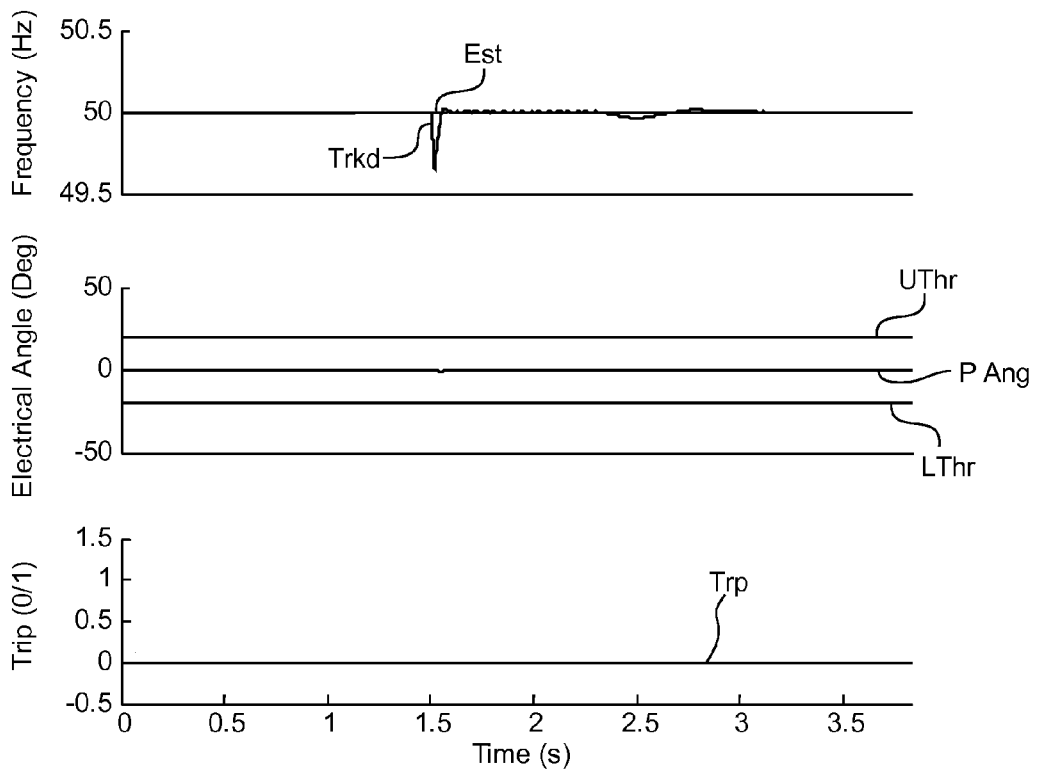

The responses of the invention method to ideal phase step changes of −5° and −10° are given in FIGS. 6A and 6B respectively and it is clear that the relay remains practically immune to the effects of the disturbance.

2. ENA (Energy Networks Association) Standard LOM Test Scenarios

The ENA test scenarios have been built using data supplied by members and are intended to provide a comprehensive set of tests for LOM methods. A collection of COMTRADE (Common Format for Transient Data Exchange) files have been created that contain the three-phase voltage waveforms extracted from the simulation engine used for transient modelling.

These scenarios are intended to test both the sensitivity and stability of LOM methods and provide a guide to settings that are the best possible compromise between the two criteria. For the case of sensitivity, a range of both active and reactive power imbalances were considered between the captured load and the pre-isolation generator output. The LOM event is initiated by the opening of a circuit breaker with the system in the steady-state. A fault on the main network followed by disconnection (i.e. loss of mains) will result in a more severe transient state in the system and will therefore be relatively easier to detect from an observation of a rate of change of frequency at the generator output terminals. Accordingly, assessing the sensitivity of relays to true LOM events is best achieved by islanding the network section by simply opening a circuit breaker without applying a fault in the system. All disturbances occur at is in these simulation cases.

Figure 7A:
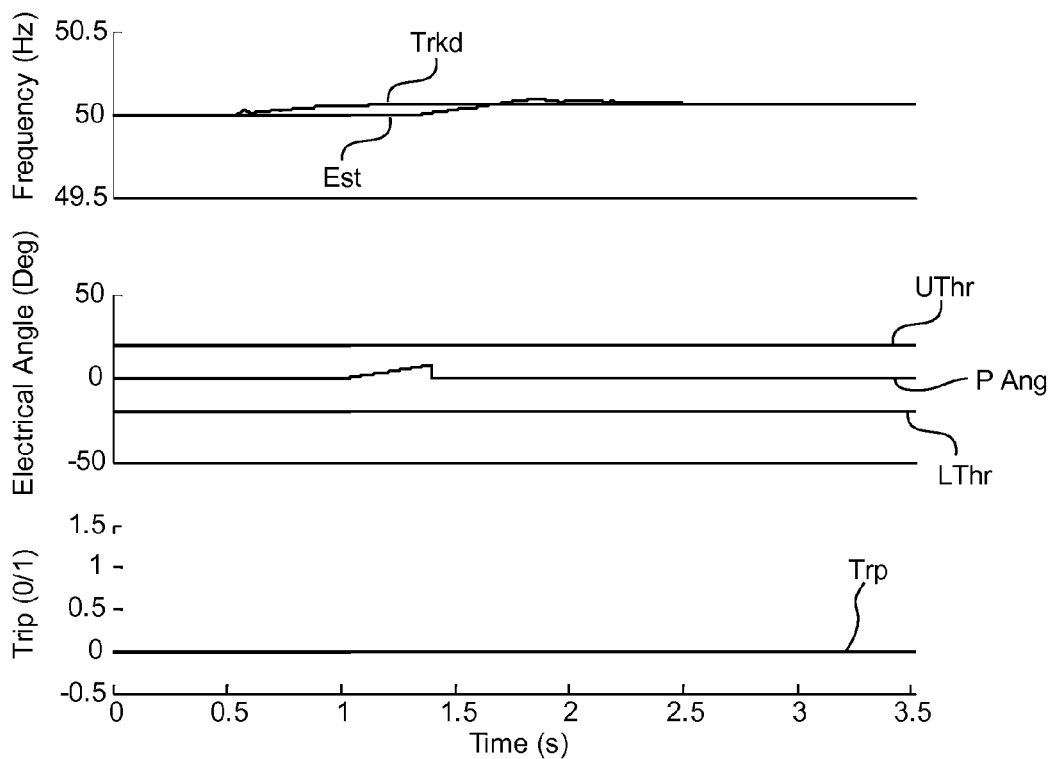
FIGS. 7A, 7B and 7C show ENA sensitivity scenario.
Figure 7B:
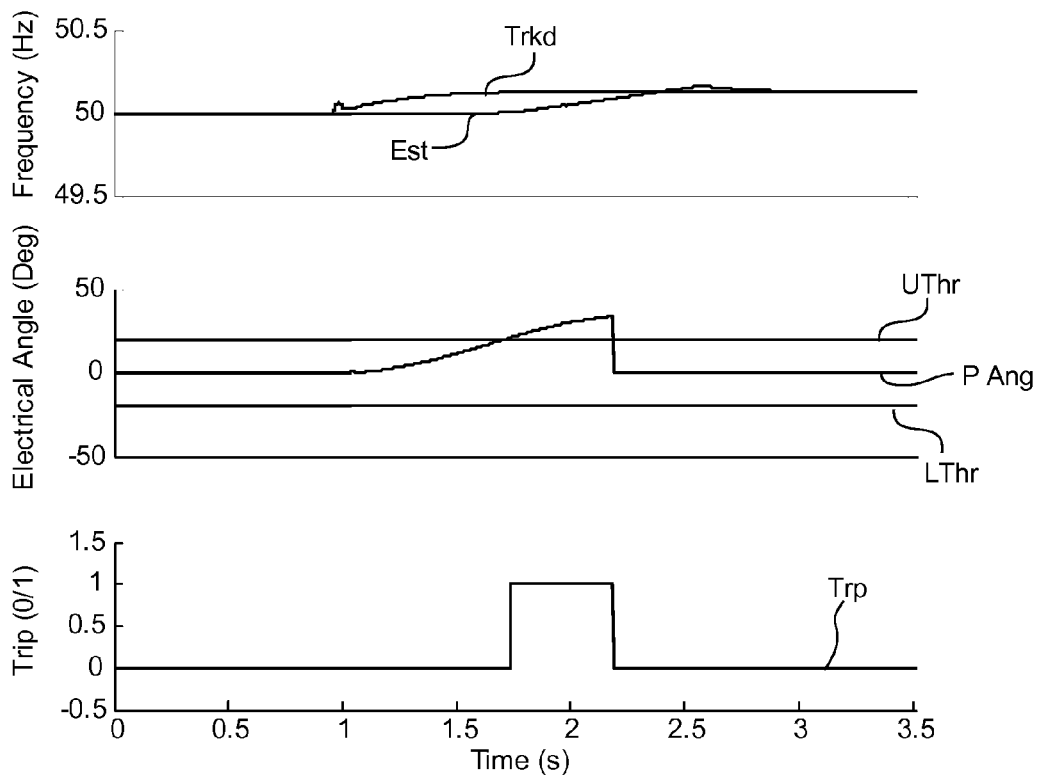
Figure 7C:
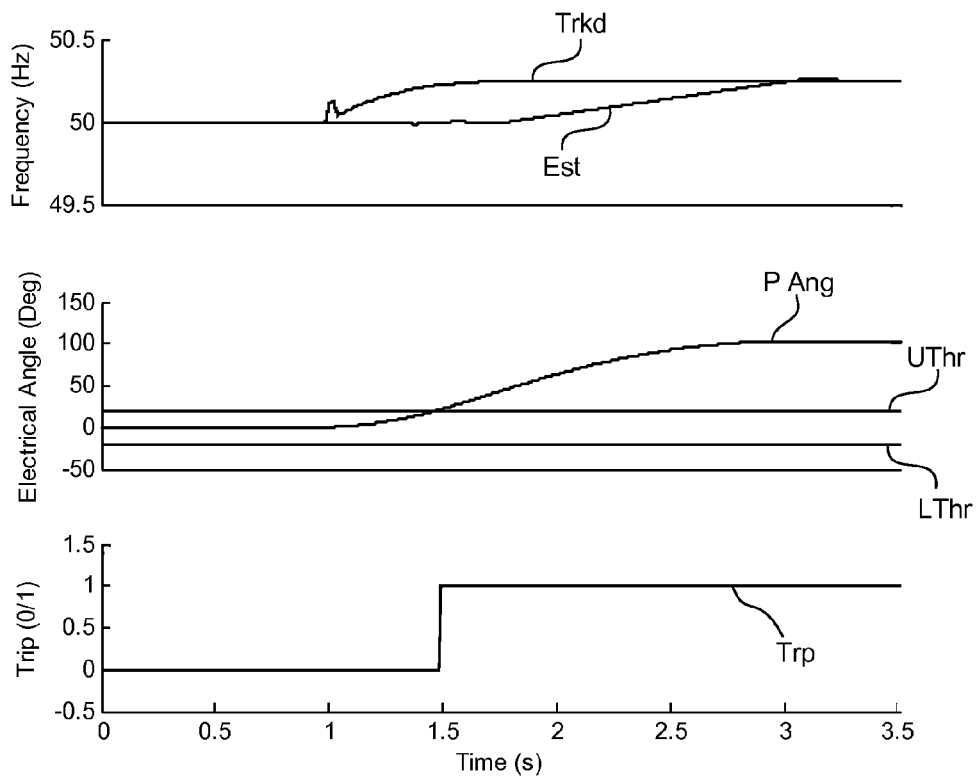

The response of the method to 2.5, 5 and 10% real power imbalances after islanding are given in FIGS. 7A, 7B and 7C (ENA 11 kV synchronous machine scenario (note that these refer to the original ENA scenarios which have since been revised to include some machine control and load representation improvements. The results used here can be regarded as being the worst case due to the specific nature of the V,f control and constant power loads used. The small impact of the phase change after islanding can be observed on the tracked frequency curve. A mismatch of 2.5% has been shown to not result in a trip. However, given the unlikelihood of such a degree of balance occurring, this is deemed to be acceptable. Indeed the recommendation made within the ENA study was that 5% should be regarded as the minimum performance level. Note that reactive power demand and generation in the island were in balance at the start of the LOM event.

The responses noted above have also highlighted that a count strategy and minimum trip pulse time is advantageous. It is thus proposed that once the element has recorded a value of angle in excess of the threshold for three consecutive iterations, a trip output will be present for 20 ms.

Figure 8A:
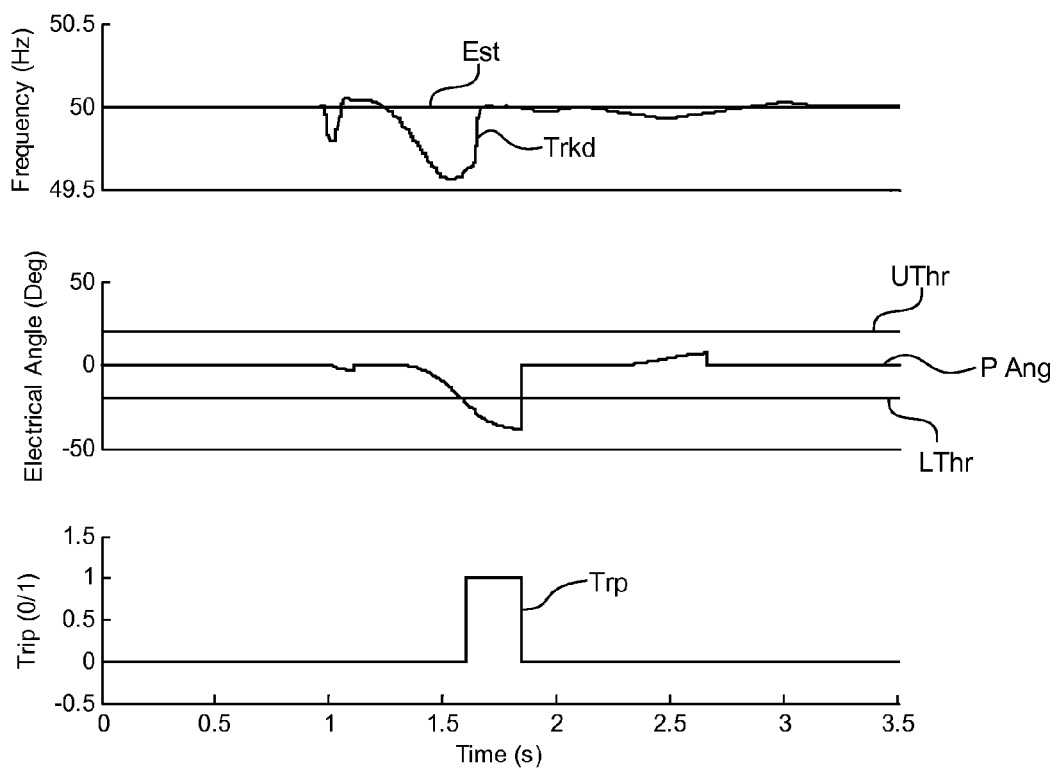
FIGS. 8A, 8B and 8C show ENA stability scenario.
Figure 8B:
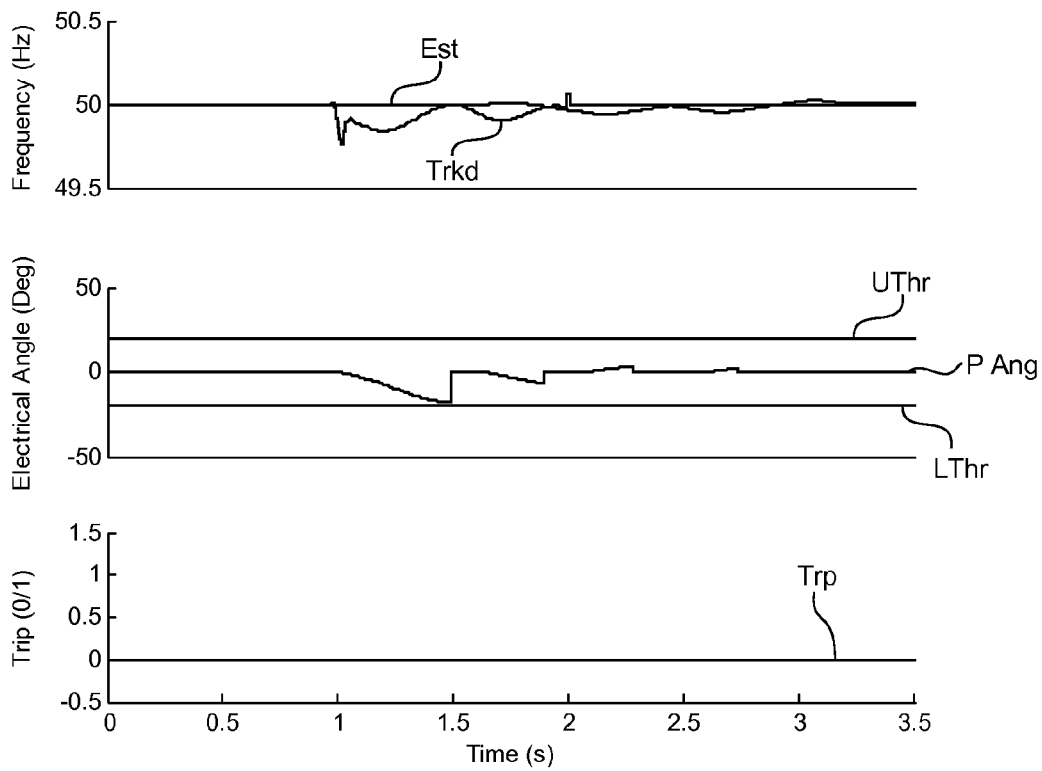
Figure 8C:
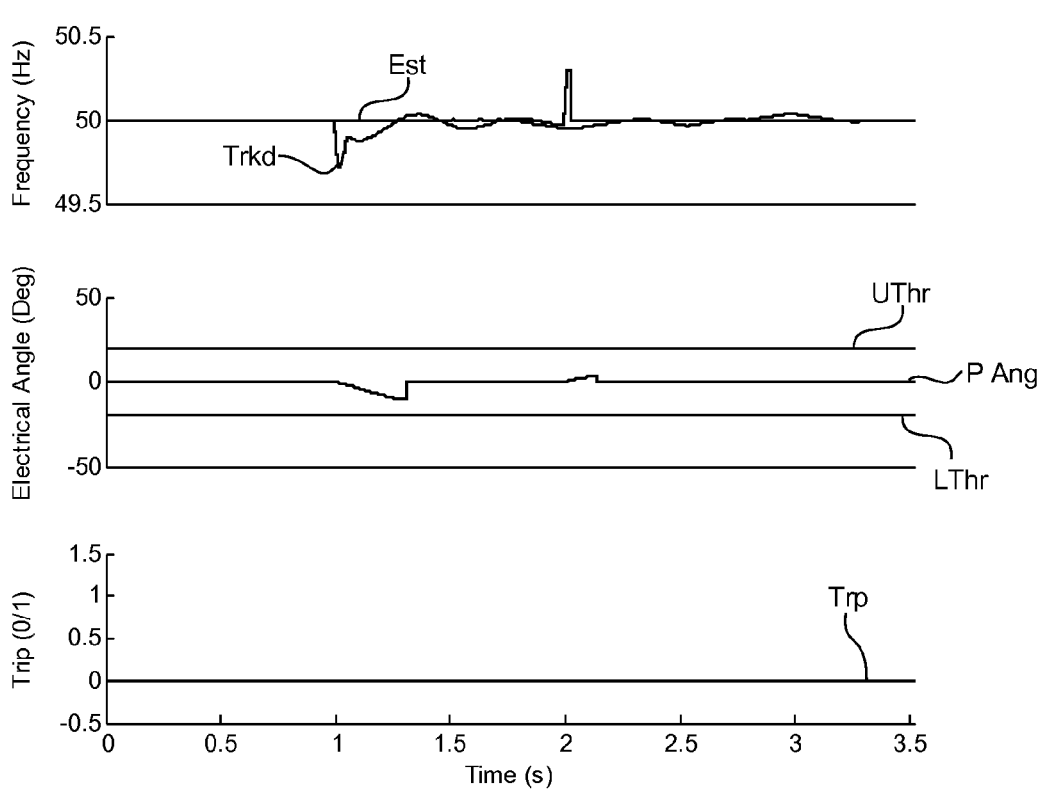

The LOM method stability has been examined using the application of phase-ground, phase-phase and three-phase faults applied for is at various locations corresponding to retained voltages of 20, 50 and 80% of nominal at the point of measurement. The response of the method to three-phase faults resulting in 20, 50 and 80% retained voltage at the measurement point are given in FIGS. 8A, 8B and 8C respectively. It can be seen that the method is inherently stable in all but the 20% case and, indeed, further studies have also demonstrated that the method is stable for all other fault types.

Figure 9:
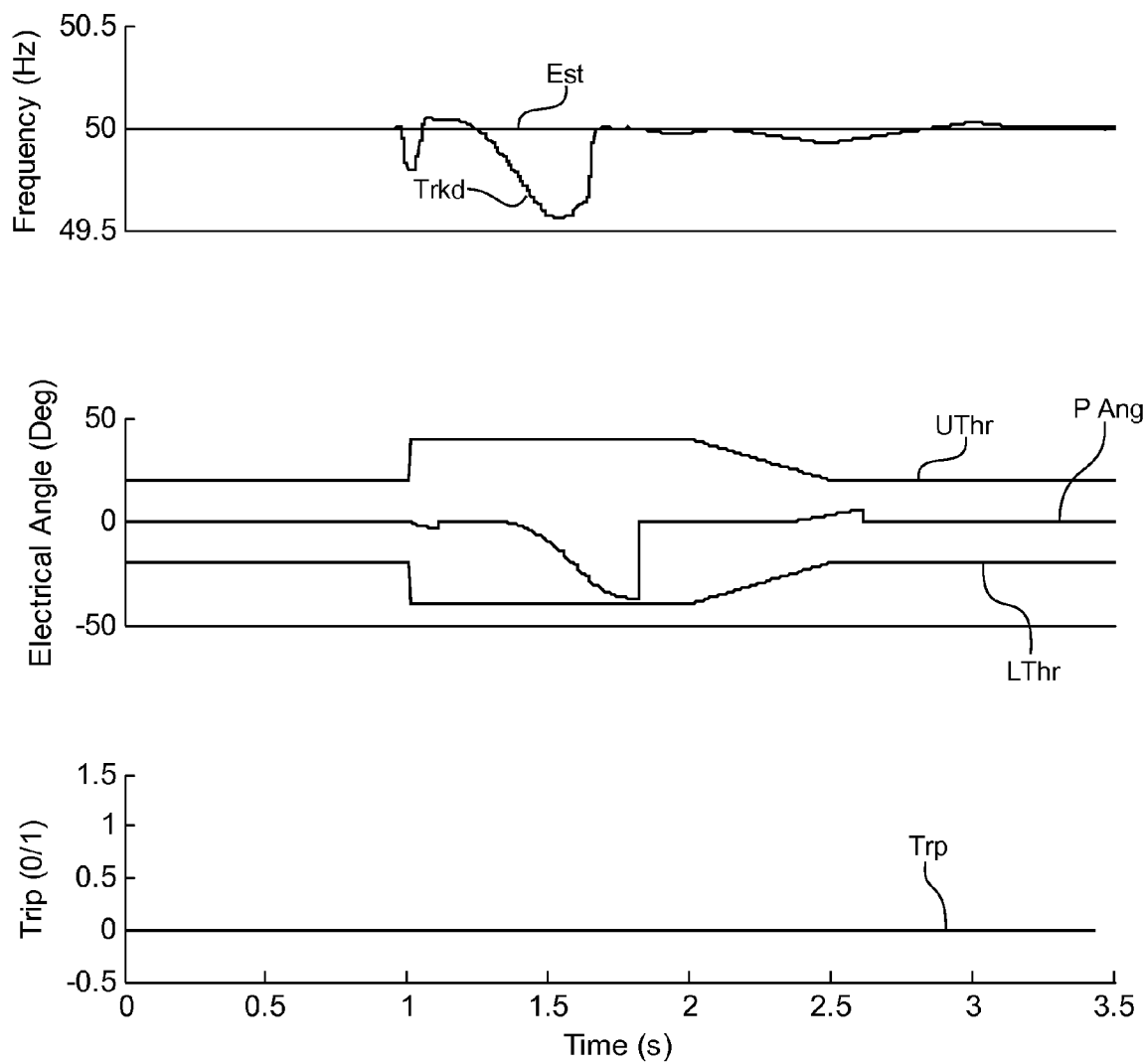
FIG. 9 show fault detection stability enhancement illustration.

If fault stabilisation is included, the method is stable for the 20% case as shown in FIG. 9. The method can now be seen as just remaining stable when the angle threshold is modified as shown. A value of 30% retained voltage is proposed for the method to provide an engineering margin. This is still an improvement over the 50% recommendation made in the reported ENA study. More thorough testing at retained voltages between 20% and 50% during simulation testing will be used to determine if this claim can be improved.

Minimum Sensitivity

The minimum ROCOF value that can be detected is related to the time delays associated with the frequency estimator. During a LOM event, after these delays have elapsed, the estimator frequency has caught up with the local frequency as measured and the electrical angle no longer increase with time. Thus the angle may not have time to reach the threshold value for tripping should the combined delays be too short or the ROCOF too small. A value of 200 Hz/s has been selected to define the sensitivity of the method as this is in excess of 160 Hz/s which is the maximum natural grid frequency variation for the UK (obtained from National Grid plc). Calculations have shown that this will lead to a trip in approximately 0.8 s.

REFERENCES

[1] "Novel Protection methods for active distribution networks with high penetrations of distributed generation" by Adam Dysko, Graeme Burt and Rafal Bugdal (DTI Centre for Distributed Generation and Sustainable Electrical Energy Novel Protection Methods for Active Distribution Networks with High Penetrations of Distributed Generation, Year II report, June 2006)

[2] "Satellite Communication Based Loss-of-Mains Protection" by A. Dysko, G. M. Burt, P. J. Moore, I. A. Glover, J. R. McDonald (9$^{th}$ International Conference on Developments in Power System Protection, Glasgow-UK, vol. 1, pp. 687-692, March 2008)

What is claimed is:

1. A phase angle drift detection method for loss of mains/grid protection, wherein the accumulated electrical phase angle drift derived from the difference between a current measured local frequency from a tracking algorithm and an estimated frequency calculated using historical data is compared to an angle threshold with the phase angle drift $\alpha_n$ being such that:

$$\alpha_n = \alpha_{n-12} + 2\pi(f_n^{est} - f_n)T_{12samples}$$

where:
- n: Sample index
- $\alpha_n$: Updated phase angle
- $\alpha_{n-12}$: Previous phase angle
- $\Delta\alpha$: $2\pi(f_n^{est} - f_n)T_{12samples}$
- $f_n^{est}$: Estimated frequency
- $f_n$: Measured frequency
- $T_{12samples}$: Time interval between two algorithm executions the estimated grid frequency being calculated using the following equation based on the historical delay, D cycles, and the window, W cycles, over which the estimated frequency is calculated:

$$f_n^{est} = f_{n-D-W} + \frac{(T_W + T_D)}{T_W}(f_{n-D} - f_{n-D-W})$$

where:
- $f_{n-D-W}$: Oldest frequency value
- $f_{n-D}$: Newest frequency value
- $T_D$: Historical time delay
- $T_W$: Estimation window wherein the addition/subtraction of the phase angle increase/decrease $\Delta\alpha$ calculated for the half cycle in the phase angle drift equation is not carried out unless the frequency difference between the estimated frequency $f_n^{est}$ and the measured frequency $f_n$ is greater or equal to a first determined value, and in that the phase angle is reset to zero once changes $\Delta\alpha$ in the phase angle have fallen below a second determined value over a moving window equal to the size of the estimation window $T_W$.

2. The method of claim 1, wherein, if the difference between a new estimated frequency and a previous estimated frequency is greater or equal to a third determined value, then the new estimated frequency is discarded and replaced with the previous estimated frequency plus the third determined value.

3. The method of claim 1, wherein, if a three phase fault is detected with a retained positive sequence voltage magnitude of less than a fourth determined value and negative sequence voltage magnitude less than a fifth determined value, then the angle threshold is increased to twice its set value for the duration of the fault.

4. The method of claim 3, wherein once the fault has been cleared, the angle threshold is linearly reduced to its set value over a period of a sixth determined value.

5. The method of claim 1, wherein the first determined value is 0.05 Hz.

6. The method of claim 1, wherein the second determined value is 0.08°.

7. The method of claim 2, wherein the third determined value is 0.002 Hz.

8. The method of claim 3, wherein the fourth determined value is 60%.

9. The method of claim 3, wherein the fifth determined value is 40%.

10. The method of claim 4, wherein the sixth determined value is 0.25 second.

11. A phase angle drift detection apparatus for loss of mains/grid protection, the apparatus comprising circuitry configured to:

derive an accumulated electrical phase angle drift from the difference between a current measured local frequency from a tracking algorithm and an estimated frequency calculated using historical data by comparing an angle threshold with the phase angle drift such than an updated phase angle value $\alpha_n$ is calculated according to a phase angle drift equation as:

$$\alpha_n = \alpha_{n-12} + 2\pi(f_n^{est} - f_n)T_{12samples}$$

where:
- n: Sample index
- $\alpha_{n-12}$: Previous phase angle
- $\Delta\alpha$: $2\pi(f_n^{est} - f_n)T_{12samples}$
- $f_n^{est}$: Estimated frequency
- $f_n$: Measured frequency
- $T_{12samples}$: Time interval between two algorithm executions the estimated grid frequency $f_n^{est}$ being calculated as:

$$f_n^{est} = f_{n-D-W} + \frac{(T_W + T_D)}{T_W}(f_{n-D} - f_{n-D-W})$$

based on the historical delay, D cycles, and the window, W cycles, over which the estimated frequency is calculated, where:

$f_{n-D-w}$: Oldest frequency value
$f_{n-D}$: Newest frequency value
$T_D$: Historical time delay
$T_W$: Estimation window wherein the addition/subtraction of a phase angle offset value Au calculated for the half cycle based on the phase angle drift equation is not carried out unless the frequency difference between the estimated frequency $f_n^{est}$ and the measured frequency $f_n$ is greater or equal to a first determined value, and in that the phase angle is reset to zero once the phase angle offset value $\Delta\alpha$ is below a second determined value over a moving window equal to the size of the estimation window $T_W$.

12. The apparatus of claim 11, wherein, if the difference between the new estimated frequency and the previous estimated frequency is greater or equal to a third determined value, then the new estimated frequency is discarded and replaced with the previous estimated frequency plus the third determined value.

13. The apparatus of claim 11, wherein, if a three phase fault is detected with a retained positive sequence voltage magnitude of less than a fourth determined value and negative sequence voltage magnitude less than a fifth determined value, then the angle threshold is increased to twice its set value for the duration of the fault.

14. A phase angle drift detection method for loss of mains/grid protection, the method comprising:
calculating an estimated grid frequency $f_n^{est}$ over a historical delay period and within an estimation window $T_W$, the estimated grid frequency $f_n^{est}$ being calculated based on an oldest frequency value, a newest frequency value, a historical time delay, and the size of the estimation window;
calculating a phase angle drift every half cycle of a fundamental waveform based on the estimated frequency $f_n^{est}$, a measured frequency $f_n$, and a time interval between two executions of an estimated grid frequency $f_n^{est}$ being calculated, wherein n corresponds to the sample index;
calculating a phase angle offset value $\Delta\alpha$ based on the phase angle drift;
if the frequency difference between the estimated frequency $f_n^{est}$ and the measured frequency $f_n$ is greater or equal to a first determined value, applying the phase angle offset value phase angle offset value $\Delta\alpha$ to derive an updated phase angle $\alpha_n$; and
resetting the phase angle $\alpha_n$ to zero if the phase angle offset value $\Delta\alpha$ is below a second determined value over a moving window equal to the size of the estimation window $T_W$.

15. The method of claim 14, wherein, if the difference between a new estimated frequency and a previous estimated frequency is greater or equal to a third determined value, then the new estimated frequency is discarded and replaced with the previous estimated frequency plus the third determined value.

* * * * *